June 19, 1928.
R. H. MELZER
1,674,018
PIPE COUPLING FOR GARMENT PRESSING MACHINES
Original Filed Sept. 29, 1920
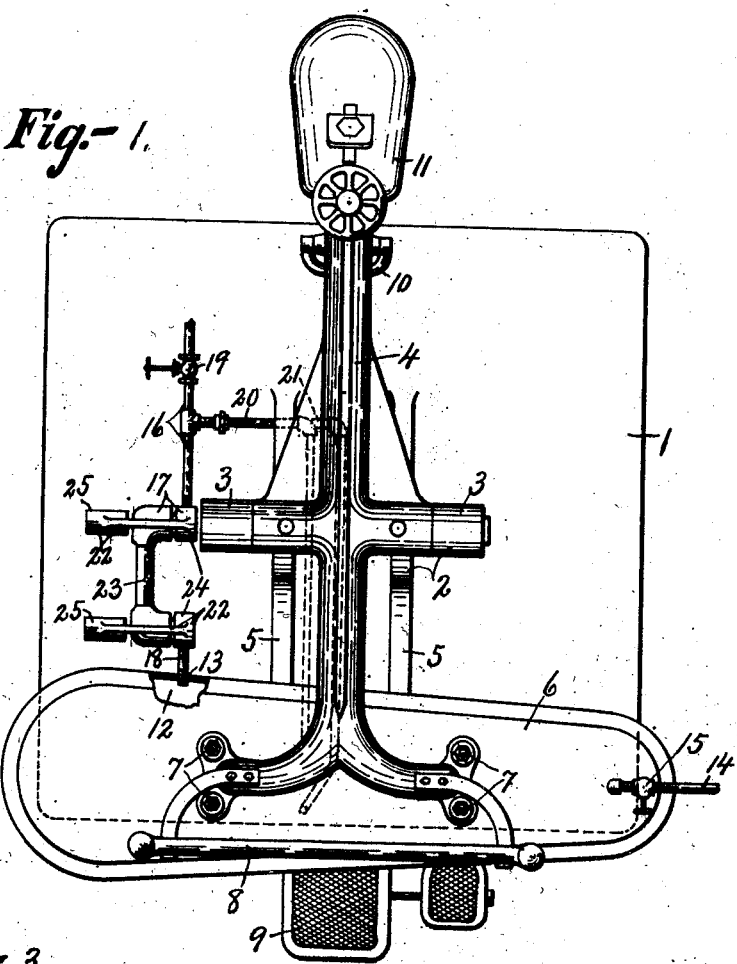
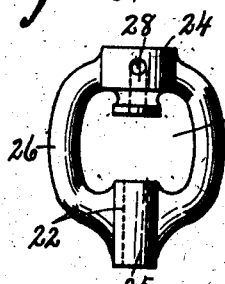
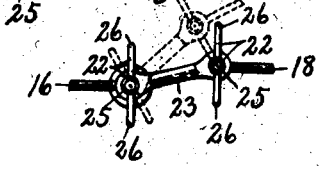
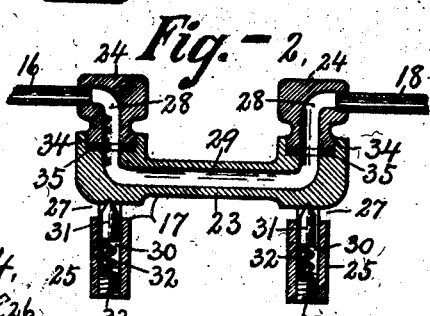
Inventor
R. H. Melzer
By Howard P. Denison
Attorney Patented June 19, 1928.

1,674,018

UNITED STATES PATENT OFFICE.

RICHARD H. MELZER, OF SYRACUSE, NEW YORK, ASSIGNOR TO TRIPLEX GARMENT PRESSER, INC., OF SYRACUSE, NEW YORK, A CORPORATION OF NEW YORK.

PIPE COUPLING FOR GARMENT-PRESSING MACHINES.

Original application filed September 29, 1920, Serial No. 413,559. Divided and this application filed October 18, 1921. Serial No. 508,590.

This invention relates to a garment pressing machine in which steam is applied for heating and moistening purposes and refers more particularly to the construction of the steam joint or coupling connection between the supply pipe and movable pressing-head.

In machines of this character, the lower and upper pressing elements, commonly known as the buck and head, respectively, are adapted to meet in a horizontal plane and are provided with heating and distributing chambers for the steam, which may be supplied from any suitable source, the upper pressing element being hinged to swing vertically about a horizontal axis some distance to the rear of the pressing element and usually in about the same horizontal plane as the meeting faces thereof as set forth in my Patent Number 1,400,088, issued December 13, 1921. This application is a division of application Serial No. 413,559 filed Sept. 29, 1920 which matured into the above mentioned patent.

Furthermore, the press-head is yieldingly mounted upon its supporting arm or lever to enable it to automatically adjust itself to different thicknesses of the material under pressure at different points throughout the pressing area and it, therefore, follows that the steam connection with the press-head must be flexible or jointed at one or more points to turn about their axis or axes coincident or parallel with the axis of the head-supporting-arm, the turning joint or joints being preferable.

Heretofore, considerable difficulty has been experienced in obtaining a joint or steam connection which would prevent leakage after a short period of use due partially to the frequent movement of the press-head but mainly to the rigid securement or retention of one or more of the joint members to or upon the frame of the machine or to the press-head, whereby undue strain would be brought upon the joint or joints by any slight inaccuracy of alinement with the axis of movement of the head-supporting-arm or by any slight tilting movement of the press-head upon said arm when clamping parts of the same garment of different thicknesses.

The main object of my present invention is to provide what may be termed a semi-floating coupling or jointed connection between the steam supply pipe and the press-head capable of automatically adjusting itself to the various movements of the press-head and its supporting-arm without overstraining any of the parts or causing undue wear thereof, and at the same time keeping the turning joints parallel with the axis of movement of the head-supporting-arm, thereby greatly reducing the liability of leakage and securing a more permanent joint.

Another object is to provide a more convenient means for taking up any wear of the joint without disconnecting any of the steam conducting parts.

Other objects and uses will be brought out in the following description.

In the drawings:

Fig. 1 is a top plan of a garment pressing machine embodying my invention.

Fig. 2 is an enlarged longitudinal sectional view of the detached coupling joint between the steam-supply-pipe and press-head.

Fig. 3 is an end view of one of the coupling yokes.

Fig. 4 is a side elevation on a reduced scale of the same coupling.

The pressing machine, as illustrated, comprises a supporting-base —1— having upright brackets —2— provided at their upper ends with horizontal bearings —3— for receiving and supporting a vertically movable rock-arm —4— forming a lever of the first kind in that it is fulcrumed or pivoted intermediate its ends in the bearings —3—, the intermediate portions of said brackets —2— being provided with forwardly extending arms —5— for receiving and supporting the buck or lower pressing element, not shown, but constructed and supported in the manner shown in my patent above referred to and also in my pending application Sr. #497,871 filed September 2, 1921.

The press-head —6— is yieldingly attached by bolts —7— to the front end of the lever —4— to move vertically about the axis of said lever toward and from the underlying buck. Any suitable connections may be used to permit relatively transverse and longitudinal rocking movement of the head upon the front end of the lever to enable the head to conform to different thicknesses of the garment under pressure and thereby to press all portions of the garment alike, as shown and described in my patent previously referred to, the front end of the lever being provided with a handle —8— by which it may be rocked forwardly and downwardly by hand if desired although it is desired to control all of the movements of the press-head and its supporting lever by means of a single pedal-lever —9— through the medium of a toggle lever —10— connected to the rear weighted end —11— of the lever —4—.

The press-head —6— is provided with a steam chamber —12— having an inlet —13— and a drainage outlet —14—, the latter being controlled by a valve —15—.

A steam-supply pipe —16— leading from any suitable source of supply is connected to one end of a jointed coupling —17— having its other end connected by a discharge pipe —18— to the press-head —6— to communicate with the chamber —12— for supplying steam to said chamber, the supply pipe —16— being provided with a suitable valve —19— for controlling the flow of steam therethrough and is also provided with branch pipes —20— and —21— leading to the buck, not shown, for supplying steam thereto for heating said buck and for moistening the garment in the manner shown and described in my pending applications above referred to.

The jointed coupling —17— is supported entirely by the steam pipes —16— and —18— independently of the lever —4— and its supporting brackets —2— and comprises a pair of similar and interchangeable yokes —22— and a hollow connecting member or pipe —23— having elbows at both ends, one of said yokes being secured to the adjacent end of the steam-supply pipe —16— substantially coaxial with the axis of movement of the lever —4— while the other yoke is secured to the pipe —18— between the first named yoke and rear edge of the press-head —6—, said yoke being connected by turning joints to the adjacent ends of the coupling member —23— and together with said coupling member are provided with suitable passages communicating with the pipes —16— and —18— for supplying steam therethrough to the chamber —12—.

The yokes —22— being identical and interchangeable, the description of one will serve for both, each yoke —15— having inner and outer hollow end heads —24— and —25— being connected by one or more, in this instance two, opposite webs or arms —26— to form an intervening opening —27— for the reception of the adjacent end of the coupling member —23—.

That is, the inner end of the heads —24— and —25— are coaxial but in spaced relation a sufficent distance to receive between them the adjacent end of the coupling member —23— and to allow a limited movement of said coupling member lengthwise of the axis of the head sufficient to permit its convenient removal and replacement in a manner presently described.

Each of the end heads —24— is provided with an angular passage —28— having one end alined with and adapted to receive the adjacent end of the steam pipe as —16— or —18— and its other end in coaxial alinement with the axis of the opposite head —25— for communication with the adjacent end of a lengthwise passage —29— in the coupling member —23— when the latter is placed in operative position with its opposite ends in the openings —27— or between the opposite heads of both of the yokes —22—.

The opposite end head —25— is provided with a lengthwise opening —30— for receiving a plunger bearing —31—, a coil spring —32— and an adjusting screw —33— whereby the adjacent end of the coupling member —23— is held in operative engagement with the end head —24— with the adjacent end of the passage —29— in communication with the corresponding passage —28—.

That is, the yokes —22— are spaced some distance apart lengthwise of the pipes —16— and —18—, which latter is preferably coaxial and therefore, the adjacent ends of the passages —28— are also coaxial but open in opposite direction, the remaining portions of said passages —28— being disposed at right angles to the axes of the pipes —16— and —18—.

The opposite ends of the passage —29— are also coaxial with the adjacent end of the passages —28— or at right angles to the axis of the pipes —16— and —18— while the remaining portions of said passage —29— are parallel with the axis of said pipes and some distance to one side thereof, as shown in Fig. 2.

The opposite ends of the coupling section —23— and adjacent yokes —22— are relatively rotatable one upon the other and for this purpose, the opposite ends of the coupling section —23— are provided with sockets —34— for receiving the adjacent cylindrical ends of the head —24— and suitable packings —35— to form steam tight turning joints.

The bearing members —31— are preferably coaxial with the turning axes of the corresponding joint between the opposite ends of the coupling member —23— and end head —24— and having their inner ends tapered to engage correspondingly tapered sockets in the outer faces of the adjacent ends of said coupling section —23— to additionally hold said coupling section in operative position and to facilitate turning movement of the yokes and coupling section relatively to each other as the head —6— is rocked vertically about the axis of the lever —4— or relatively to said lever as permitted by the connecting bolt —7—.

These bearings —31— are movable axially and may be tightened whenever necessary by the adjustment of the screw —33— to take up wear of the packing rings —34— at the turning joint although the springs —30— serve to perform this take-up function automatically and thereby to assure a more perfectly steam tight joint at each bearing.

In case it should become necessary to remove the coupling section —23— for repacking the joint or other repairs, it is simply necessary to loosen the screws —33— thereby releasing the tension of the springs —32— and permitting the coupling section —23— to be withdrawn laterally from engagement with the outer ends of the head —24— whereupon the section —23— may be withdrawn endwise from between the heads —24— and —25—, thus exposing the sockets —34— for the removal of the old packings and replacement of the new ones after which the coupling section —23— may be restored to its operative position and retightened by the proper adjustment of the screws —33—, these operations being performed without disconnecting the yokes from their respective steam pipes —16— and —18—.

What I claim is:

1. A pipe coupling of the character described, comprising a circular yoke having an opening therethrough and end heads at opposite ends of the opening provided with co-axial openings therein, a pipe elbow inserted in the opening in the yoke and having its open end abutting against the inner face of one of the heads and communicating with the opening therein and its closed side facing the opening in the other head, means in the last-named opening for holding the open end of the elbow pipe against the inner face of the first-named head, and an additional pipe connected to the opening in said first-named head beyond the open end of the pipe elbow.

2. A pipe coupling of the character described comprising a pipe having its opposite ends provided with elbows, the open sides of which face in the same direction, a pair of separate circular yokes each surrounding one of the elbows and provided with opposite end heads having openings therein co-axial with the open ends of the elbow, one of the openings in the end heads communicating with an opening in the elbow and separate devices in the openings in the other end heads engaging the closed ends of the elbows for holding said elbows in operative connection with the first-named end heads.

In witness whereof I have hereunto set my hand this 11th day of October, 1921.

RICHARD H. MELZER.